United States Patent [19]

Gould

[11] 4,453,579

[45] Jun. 12, 1984

[54] FUEL SUMP DRAINAGE TOOL

[76] Inventor: Gerry E. Gould, Rte. 3, Box 150, Newport, N.C. 28570

[21] Appl. No.: 382,801

[22] Filed: May 27, 1982

[51] Int. Cl.³ .......................................... B65G 45/00
[52] U.S. Cl. ................................... 141/329; 141/387; 222/159
[58] Field of Search ................ 141/1, 83, 94, 97, 106, 141/114, 329, 330, 351, 353, 364, 368, 369, 371, 372, 378, 387, 391, 392; 137/559; 222/159; 184/1.5

[56] References Cited

U.S. PATENT DOCUMENTS

| | | | |
|---|---|---|---|
| 1,951,498 | 3/1934 | Whitney | 184/1.5 |
| 2,728,488 | 12/1955 | Hankins | 141/114 X |
| 2,755,969 | 7/1956 | Rainero | 141/94 X |
| 2,953,156 | 9/1960 | Bryant | 137/263 |
| 3,219,071 | 11/1965 | Ferster | 141/94 |
| 3,288,178 | 11/1966 | Johnson | 141/392 X |
| 3,291,165 | 12/1966 | Fraylick | 141/286 |
| 3,664,386 | 5/1972 | Wenzel | 141/100 |
| 3,797,538 | 3/1974 | Mollura | 141/368 X |
| 4,267,945 | 5/1981 | Maynard, Jr. | 141/330 X |
| 4,269,237 | 5/1981 | Berger | 141/346 |
| 4,371,015 | 2/1983 | Simons | 141/330 X |

FOREIGN PATENT DOCUMENTS 738173  7/1966  Canada ................................. 141/330

*Primary Examiner*—Stephen Marcus
*Assistant Examiner*—Mark Thronson
*Attorney, Agent, or Firm*—Browdy and Neimark

[57] ABSTRACT

Two forms of a tool for draining fuel from the sumps of aircraft are disclosed, wherein a hollow body is fitted with an adjustable needle at its front end, the needle being mounted in a fuel block fixed in closely spaced relation to the upper end of the body. The fuel runs down the outside of the solid needle, collects in the cup formed by the fuel block, and then drains through openings in the block through the inside of the body and into a container. This facilitates turn around time, allows inspection of the fuel while it is draining, and clearly indicates the completion of the draining operation.

4 Claims, 8 Drawing Figures

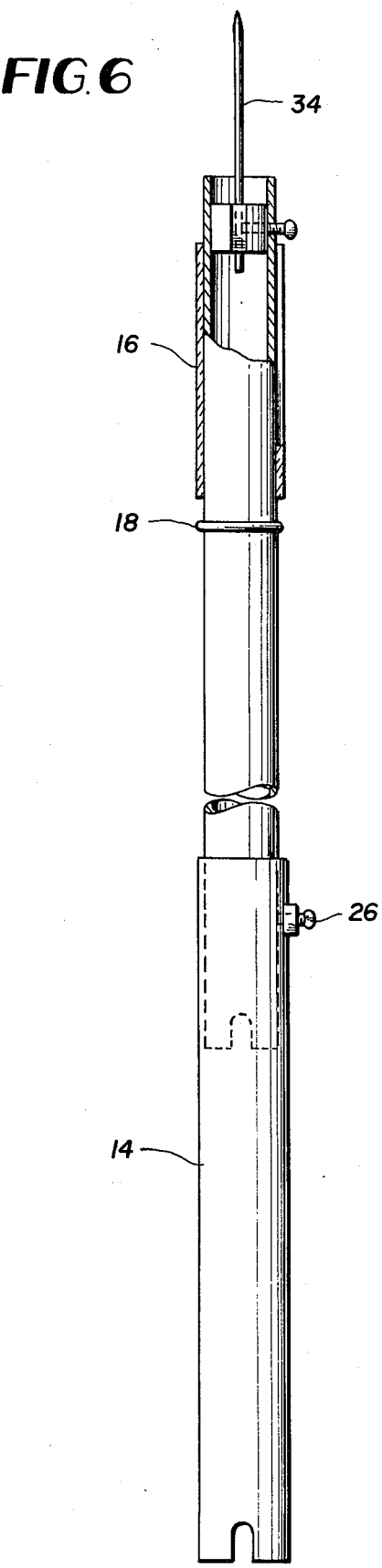
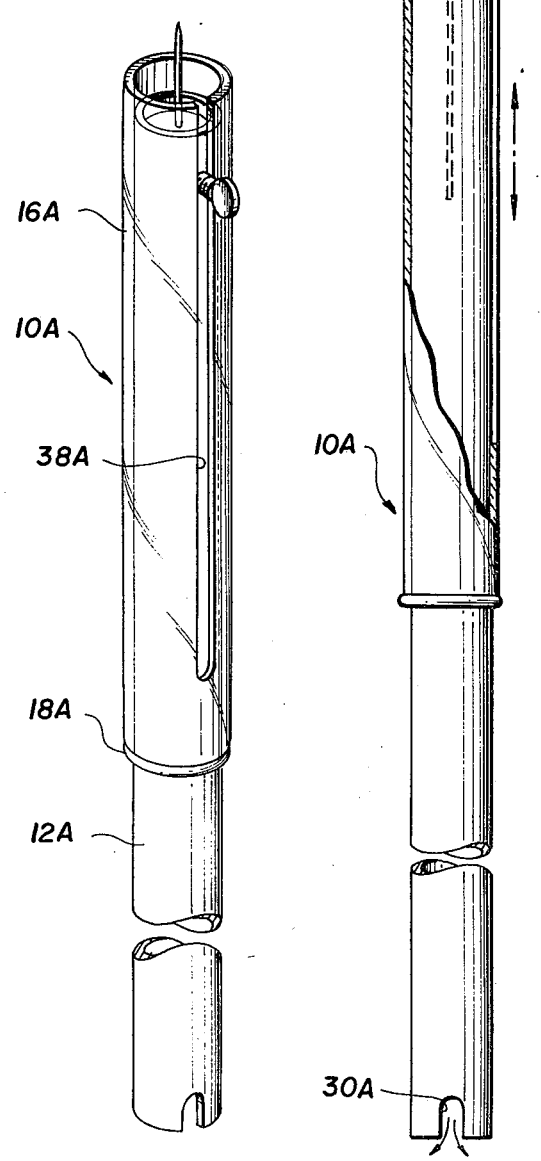
FIG. 6 FIG. 7 FIG. 8

FUEL SUMP DRAINAGE TOOL

BACKGROUND OF THE INVENTION

In aircraft maintenance it is necessary, on a frequent and systematic basis, to drain the fuel from the tanks or sumps of the aircraft.

Among the reasons for this maintenance procedure is to prevent the growth of micro-organisms in the tanks. Such micro-organisms, if allowed to establish themselves in the tanks, can cause serious corrosion problems, can obstruct filters, and can alter the characteristics of the fuel quantity transmitter located in the tank, which can cause false fuel quantity readings on the gauges in the cockpit. This, of course, can cause very severe consequences indeed, including the possibility of crashing the aircraft.

During such maintenance procedures, it is necessary that the maintenance personnel visually inspect the fuel as it is being drained to look for contaminants, micro-organisms, and the like. Further, it is important, from the point of view of economy and quickly "turning around" the aircraft so that it can continue in commercial use, that the maintenance procedures be performed as quickly as possible.

In addition, it is necessary that the sump drainage procedures be done as safely as possible as to not exposing the personnel doing the work to being splashed or the like by the jet fuel which they are handling.

PROBLEMS IN THE PRIOR ART

Many aircraft include a sump positioned in the fuel system between the tank and the engine. When the engine is shut down, all of the fuel outside of the tank in the system drains into this sump. It is this fuel collected in this sump which is used for the test purposes, and it is this fuel which must be drained, at least daily for aircraft in commercial use.

Aircraft manufacturers provide a fuel sample cup. This has to be held up manually to the opening in the sump for the fuel to be collected therein. Often times, the amount of fuel in the sump is greater than the capacity of this cup, and thus the maintenance personnel must make some provision to collect the excess fuel which overruns the cup. This often comprises holding a jar or the like under the cup and to very carefully work to collect the fuel from the sump in the cup and collect the overflow from the cup in the jar. This is all done in a hands and arms upraised posture, which is extremely tiring, and runs a very high risk of splashing fuel, causing danger and discomfort to the personnel and to the equipment.

Certain prior art devices intended for draining liquids in general, as opposed to draining the fuel from aircraft sumps for maintenance purposes, include a hollow needle with the liquid to be tapped permitted to run through the inside of the hollow needle. At first impression, this seems to be a desirable way to go, since the liquid is contained. However, in the environment of the present invention, such prior art techniques including the use of hollow needles are totally to be avoided since the hollow needles provide another place for blockage, that is contaminants in the fuel can block up the hollow needle even more easily than the larger passageway in the engine. Further, as to the economies of work and the need to speedily turn the aircraft around, the hollow needle is totally useless since the operator or maintenance personnel cannot see the fuel running through the inside of the hollow needle, and thus have no way of telling when all of the fuel has been tapped out of the sump.

Another problem in the prior art is the whole process of engaging and disengaging the tool for tapping with the aircraft. In the present invention, the length of the tool facilitates this, and the adjustability accommodates the tool to aircraft of many different heights, that is height from the ground level to the sump tapping point. In the prior art, ladders, other devices, would be necessary, and different such devices would be required depending upon the different heights of the aircraft. Further, screw connections and the like are often needed in the prior art, and such connections are greatly simplified in the sump tool of the invention. In summary of this point, the invention provides a highly improved and more efficient manner of engaging and disengaging itself from the aircraft sump tanks with which it is used as compared to prior art devices which include fuel cups, rupturable membranes, hollow needles and the like. No rupturable membranes are used in conjunction with the present invention, and their elimination is deemed an advantage for the present invention over the prior art in general including that feature.

SUMMARY OF THE INVENTION

The present invention provides two forms of an improved sump fuel tapping tool of the character described, and in both cases, an elongated hollow body is provided having an adjustable needle at one end for insertion into the sump opening of the aircraft. The needle, it is significant to note, is a solid member, and is adjustable with respect to a block located in closely spaced relation to the upper end of the hollow body. This block is formed with a pair of side openings, to thus form the functional equivalent of a fuel cup at the upper end of the hollow body.

Further, and more significantly, the fuel runs down on the outside of the needle, and the tool is positioned such that the operator can see the motion of the fuel. This is very significant from the point of view that it allows the maintenance personnel to view the fuel looking for contaminance and the like as it drains, and, it clearly indicates that the sump is fully drained when there is no further fuel running down the outside of the needle.

The two forms of the invention include numerous features which are used separately on the two forms and interchangeably.

One of these features is a wind screen provided at the upper end which is adjustable on the upper end of the outside of the hollow body. This wind screen is preferably made of a transparent material so that the maintenance personnel can view the fuel while the tool is working while at the same time protecting the fuel and the operator from wind blown droplets of fuel being blown off of the needle as could occur during windy conditions at the airport.

Another feature of the two embodiments of the invention is an extension at the lower end of the hollow body. This lower end extension is in the preferred form of the invention and is desirable because it allows the overall length of the tool to be adjusted over a long distance to accommodate the invention tool to many different aircraft. The invention also includes the fact that the needle is adjustable in and out of its block in which it is mounted, this also performs a function of accommodating the tool to different heights of aircraft. However, a lower end extension is preferred since the needle could bend in use if extended out beyond the tool more than a predetermined amount.

Another feature is the provision of notches in the lower end of the tool or in the end of the tool extension or in both these parts for the purpose of permitting the fuel to easily run out of the inside of the tool and into a bucket or other container in which the fuel is being collected.

Another advantage of the invention overall is that is a very simple device lending itself to easy manufacture from relatively inexpensive materials. The invention can be formed substantially entirely from aluminum tubing, plastic tubing, and ordinary bits and pieces of hardware such as nuts and thumb screws.

BRIEF DESCRIPTION OF THE DRAWINGS

The above and other advantages of the invention will be pointed out or will become evident in the following detailed description and claims, and in the accompanying drawing also forming a part of the disclosure, in which:

FIG. 6 is a view similar to FIG. 1 showing the needle extended and the lower end extension dropped, both generally in accordance with the showing of FIG. 2;

FIG. 7 is a view similar to FIG. 3 showing the second form of the invention; and FIG. 8 is a top end perspective view of the second form of the invention shown in FIG. 7 with the wind screen in partially raised position.

DETAILED DESCRIPTION OF THE ILLUSTRATED EMBODIMENTS OF THE INVENTION

Figure 1:
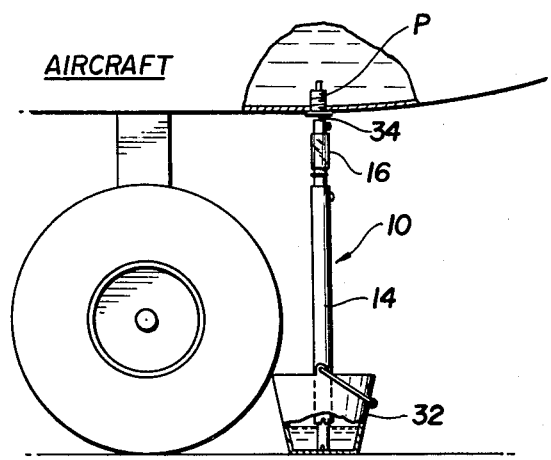
FIG. 1 is a side elevational view of the preferred first form of the invention shown in use draining the fuel out of an aircraft sump.
Figure 2:
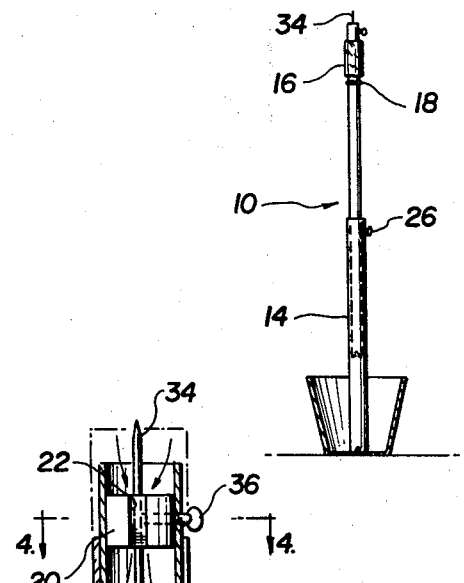
FIG. 2 is a view similar to FIG. 1 showing the invention tool in extended position as it would be used in the FIG. 1 configuration when used to drain fuel from an aircraft in which the sump is higher off the ground than in the aircraft of FIG. 1.
Figure 4:
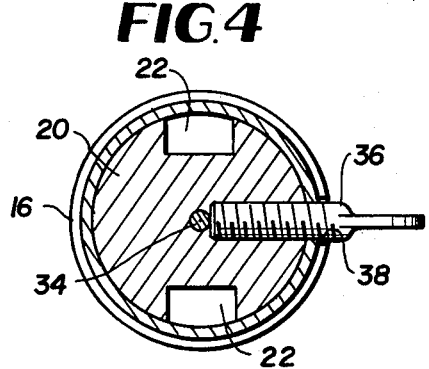
FIG. 4 is a transverse cross-sectional view taken on line 4—4 of FIG. 3.

Referring first to FIGS. 1 through 6, the preferred form of the invention 10 comprises a main body 12 having a lower end extension 14 and an upper end extension 16 slidably mounted on the upper and lower ends thereof respectively. A ring member 18 is mounted at a predetermined spaced relation with respect to the two ends of the main body 12 to define the limits of motion of the screen 16 and the extension 14 towards each other. At the upper end of the main body 12 there is fixedly mounted a fuel block 20, best seen in FIGS. 3 and 4. Block 20 is formed with a pair of slots 22 of predetermined cross-sectional area, the slots extending all the way through the block from top to bottom axially of the block 20 and the body of 12.

While the Figures show a pair of openings 22 to cause the fuel to collect in the space above the block inside the upper end of the body 12, it is, of course, possible the different sized, shapes and numbers of openings equivalent to the slots 22 could be provided to control the flow of fuel and to permit its draining through the block and down into the collection vessel at the lower end of the tool.

Figure 3:
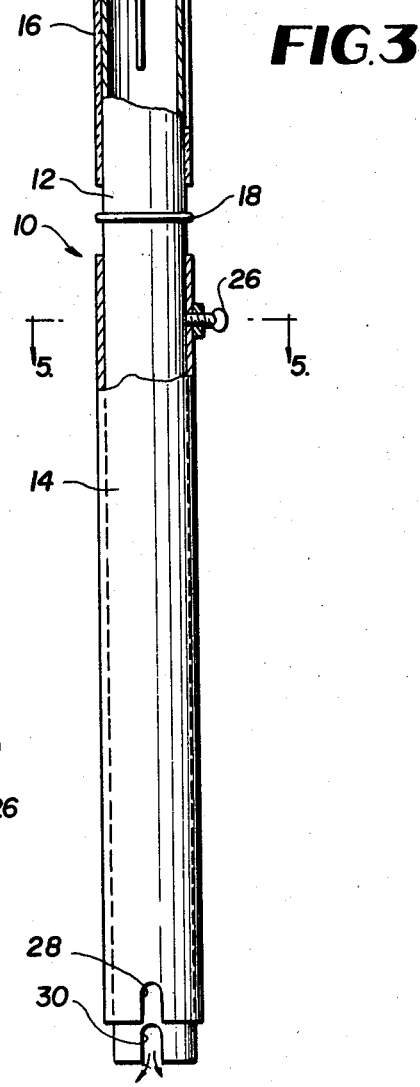
FIG. 3 is an enlarged side elevational view partly in cross-section of the first form of the invention shown in FIGS. 1 and 2.
Figure 5:
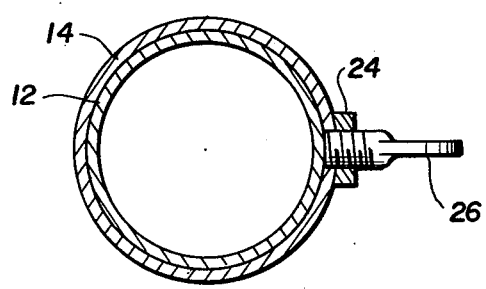
FIG. 5 is a transverse cross-sectional view taken on line 5—5 of FIG. 3.

Means are provided to adjustably and fixedly mount the lower end extension 14 with respect to the body 12, see FIGS. 3 and 5. To this end, a nut 24 is fixed as by welding or the like to the extension 14 in closely spaced relation to its upper end, and a thumb adjusting screw 26 is threadedly mounted in the nut 24, fits through a suitably formed opening in the extension 14, and bears against the side of the main body 12 to thereby simply and easily hold the extension in adjusted position on the main body.

The lower end of the extension and of the main body are notched as indicated at 28 and 30, respectively, as shown in FIGS. 1 and 3, for the purpose of permitting the fuel to easily drain out of the sump tool and into a bucket 32 or the like in use. That is, if the lower end of the tool and of the extension were not notched as shown, and the tool was used in a straight vertical position and bearing tightly up against the bottom of the bucket or other collection vessel, it is possible that the fuel would simply collect on the inside of the tool and would not flow into the bucket or other collection vessel.

In that respect, it is not at all essential that the tool be used in a dead plumb position with respect to the aircraft. The tool could be positioned at a substantial angle off the vertical and the needle would still operate properly, as set forth below, and this ability to operate at an angle off of vertical is an advantage for the invention and adds to its versatility in use.

The screen 16 is preferably made of a clear plastic material, and selected to be of a diameter so that it snugly fits on the upper end of the main body 12. In this manner, no particular securing means are required for the screen, it is simply slid up and down in use as needed, and remains in any adjusted position due to internal friction. If desired, 0 rings or the like could be provided on the inside of the main body on which the windscreen could slid to ease its motion and to better secure it in position in use. This is not deemed a serious problem, however since each application of the invention tool 10 to an aircraft during maintenance procedures only lasts for a few minutes, and further, the screen 16 is only utilized under windy conditions and not for every use of the invention tool. The raised condition of the windscreen is shown in dotted lines in FIG. 3 for the first embodiment and in FIG. 7 for the second embodiment.

Means are provided to physically drain the fuel from the aircraft and to conduct it through the inside of the body 12 into the bucket 32. To this end, block 20 is formed with an opening in which is snugly mounted a needle 34. A thumb screw 36 is provided to bear tightly against the needle 34, see FIG. 4, to hold the needle in adjusted position with respect to the block 20 and the tool 10. The generally retracted and generally extended positions of the needle 34 in the tool can be seen from a comparison of FIGS. 3 and 6.

As indicated by reference letter P in FIG. 1, different aircraft have different means to permit tapping of the fuel out of the sump. In some cases, this is a spring loaded device designed with a small orifice, and in such case, the needle used in the invention tool will closely fit in that orifice. For other aircraft having different kinds of drainholes and drainhole plugs, different accommodations, variations, additional devices, and the like are easily provided by those skilled in the art for cooperation with the invention tool.

Wind screen 16 is formed with an elongated notch 38 to permit the screen to clear the screw 36 in the upper and lower adjusted positions of the screen on the tool. This notch is most easily seen in the second embodiment in its form 38A in FIG. 8.

In FIGS. 7 and 8, there is shown a second form of the invention 10A in which parts the same as or similar to those described above in regard to the first form 10 are indicated by the same reference numerals followed by "A".

The primary difference between the two forms of the invention is that in the second embodiment the extension 14 is omitted, and the invention provides for accommodating different heights of aircraft by a greatly elongated needle 34A, see FIG. 7. FIG. 7 also shows the manner in which the invention operates in collecting fuel, the arrows indicating collection of the fuel in the space above the block 20 and inside the upper end of the main body 12, flowing then through the slots 22 or 22A, and thence through the tool and out the bottom end notch 30 or 30A into the collection vessel.

As can be readily appreciated from a comparison of FIGS. 3 and 7, another difference resulting from this difference in the lengths of the needles 34 and 34A is that the wind screen 16A has a considerably longer axial length than the wind screen 16 in order to accommodate the considerably longer possible axial extension of the needle 34A.

The advantage and tradeoff with the two forms of the invention is that the second form of FIGS. 7 and 8 is somewhat less expensive to manufacture, but the concurrent disadvantage is that the needle, when extended out a long way, runs the risk of bending in use, which could cause some droplets of fuel to spill or which could damage the tool. Generally, it is anticipated that the second form of the invention will be used more frequently in smaller aircraft having a closer stance to the ground, whereas the preferred form of FIGS. 1 through 6 is of more general utility but could be preferably used with taller aircraft having a higher stance of the sump with respect to the ground. In order to preclude the possibility of the needle bending in the preferred form wherein the lower end extension is provided, the needle 34 in that form has a predetermined and relatively short length, so that even at the maximum extension as indicated in FIG. 6 still it is highly unlikely the needle will bend in use.

While the invention has been described in detail above, it is to be understood that this detailed description is by way of example only, and the protection granted is to be limited only within the spirit of the invention and the scope of the following claims.

I claim:

1. A tool for draining fuel from aircraft comprising an elongated hollow body having an upper end and a lower end, a fuel block mounted at said upper end of said hollow body, said block being formed with at least one opening to permit fuel to flow across said block, said solid drain needle, means to mount said drain needle in said block to extend out from said upper end of said hollow body, notch means to permit the flow of fuel therethrough formed in said lower end of said hollow body, an extendable extension slidably mounted on said lower end of said hollow body, said lower end extrusion having a substantial length with respect to the overall length of said hollow body, and securing means to adjustably secure said extension in an adjusted position with respect to said hollow body to thereby determine the overall length of said tool in use.

2. The tool of claim 11, and said extension being formed with a notch in the lower end thereof to permit the flow of fuel therethrough.

3. A tool for draining fuel from aircraft comprising an elongated hollow body having an upper end and a lower end, a fuel block mounted at said upper end of said hollow body, said block being formed with at least one opening to permit fuel to flow across said block, a solid drain needle, means to mount said drain needle in said block to extend out from said upper end of said hollow body, notch means to permit the flow of fuel therethrough formed in said lower end of said hollow body, an extrusion member adjustably mounted on said lower end of said hollow body, wind screen means adjustably mounted on said upper end of said hollow body, the overall length of said lower end extension member and of said wind screen means totaling less than the overall length of said hollow body, and stop means fixedly mounted to said hollow body in an axially predetermined location thereon to thereby act as a stop for both said wind screen means and said lower end extension member and to prevent said wind screen means and said lower end extension member from striking each other.

4. A tool for draining fuel from the sumps of aircraft comprising an elongated hollow body of circular cross-sectional shape, said hollow body having an upper end and a lower end, wind screen means mounted at said upper end of said hollow body, an extension mounted at said lower end of said hollow body, said extension and said wind screen means together constituting an overall length less than the length of said hollow body, said lower end extension having an axial length substantially greater than the axial length of said wind screen means, a fuel block fixed into the inside of said hollow body in predetermined closely spaced relation to said upper end thereof, passageway means formed in said fuel block to permit the flow of fuel therethrough, said passageway means having a predetermined cross-sectional area to permit the flow of fuel from said upper end of said hollow body above said block to the inside of said hollow body via said passageway means, a solid needle mounted in said fuel block, means to adjustably position said solid needle axially with respect to said fuel block and said upper end of said hollow body, said solid needle having a length with respect to the position of said fuel block in said upper end of said hollow body such that said needle will extend outwardly of said hollow body; whereby said solid needle can extend towards and into the sump of an aircraft the fuel in which is to be drained; and said wind screen means consisting essentially of transparent material; whereby said transparent wind screen means permits viewing of fuel running from said sump down said solid needle and into the inside of said hollow body when said wind screen means is raised to protect the fuel on said needle from being blown off of said needle by windy conditions.

* * * * *